United States Patent [19]
Nezu

[11] 4,192,450
[45] Mar. 11, 1980

[54] ODOMETER

[75] Inventor: Hisao Nezu, Nagaoka, Japan

[73] Assignee: Nippon Seiki Kabishiki Kaisha, Niigata, Japan

[21] Appl. No.: 12,460

[22] Filed: Feb. 15, 1979

[30] Foreign Application Priority Data

Sep. 22, 1978 [JP] Japan .................... 53-130564[U]

[51] Int. Cl.² .................................. G01C 22/00
[52] U.S. Cl. .......................... 235/95 R; 235/96
[58] Field of Search ............ 235/95 R, 95 C, 96, 235/97, 117 R, 132 R

[56] References Cited

U.S. PATENT DOCUMENTS

| 2,077,666 | 4/1937 | Bliss | 235/95 R |
| 2,409,537 | 10/1946 | Bright | 235/95 R |
| 3,636,320 | 1/1972 | Wallis | 235/96 |
| 3,667,671 | 6/1972 | Hachtel | 235/96 |
| 3,756,506 | 9/1973 | Inoue | 235/95 R |
| 3,986,005 | 10/1976 | Itoh | 235/96 |

FOREIGN PATENT DOCUMENTS 2415114 3/1974 Fed. Rep. of Germany ........ 235/95 R

Primary Examiner—Stephen J. Tomsky
Attorney, Agent, or Firm—Burgess, Ryan and Wayne

[57] ABSTRACT

A tamper preventive odometer wherein a driving gear operatively coupled to a driving shaft of a tachometer and a least significant digit wheel are coupled through a driving plate and a locking plate which locks the rotation in the subtractive direction of the LSD wheel, thereby preventing tampering of the odometer.

5 Claims, 5 Drawing Figures

ODOMETER

BACKGROUND OF THE INVENTION

The present invention relates to a counter or an odometer capable of preventing tampering or the rotation in the subtractive direction.

There have been devised and demonstrated various types of tamper preventive odometers. Of these the most common type is such that a drive shaft which rotates in proportion to that of wheels of a vehicle carries a worm gear which is pressed under the force of a spring against a gear made integral with a least significant digit (LSD) wheel of an odometer in such a way that the rotation of the drive shaft may be transmitted to the least significant digit wheel in one or additive direction, but when the drive shaft is rotated in the opposite or subtractive direction, the consequent rotation in the other or subtractive direction of the worm gear causes the decrease in strength of the spring, resulting in the disengagement of the worm gear with the gear of the least significant digit gear. As a result, the rotation in the other or subtractive direction of the odometer may be prevented.

However, tamper preventive odometers of the type described have to use a worm gear which is relatively long, resulting in an increase in size. In addition, the spring-actuated clutch for engaging and disengaging between the worm gear and the gear carried by the least significant digit wheel is complicated in construction.

SUMMARY OF THE INVENTION

Accordingly, one of the objects of the present invention is to provide a tamper preventive odometer which is very simple in construction yet very reliable and dependable in preventing the rotation in the other or subtractive direction of the odometer.

To the above and other ends, briefly stated the present invention is to provide a tamper preventive odometer wherein the least significant digit wheel is operatively coupled to a driving pinion gear, which in turn is drivingly coupled to, for instance, a drive shaft of a tachometer, through a driving plate and a locking plate. When the driving pinion gear is rotated in one or additive direction, the driving plate which always rotates in unison with the driving gear couples between the latter and the least significant digit wheel so that the rotation in the additive direction of the odometer may be positively permitted. On the other hand, when the driving gear is rotated in the other or subtractive direction, the driving plate is merely resiliently pressed against the least significant digit wheel and is free to rotate relative to the latter while the rotation in the other or subtractive direction of the least significant digit wheel is positively locked by the locking plate which is unrotatably mounted on the shaft upon which are mounted for rotation a plurality of odometer wheels including the least significant digit wheel. More particularly, one side face of the least significant digit wheel adjacent to the driving gear is formed with a plurality of equiangularly spaced apart first engaging means in the form of projections or recesses adapted to operatively engage with the pawls at the free ends of arcuate, elastic arms of the driving plate only and only when the latter is rotated in one or additive direction, the first engaging means being kept out of engagement from the pawls when the driving disk is rotating in the other or subtractive direction. The least significant digit wheel is also formed with one or more second engaging means located radially inwardly of the first engaging means and adapted for locking engagement with the pawls of the locking plate, which is substantially similar in construction to the driving plate, only and only when the least significant digit wheel is rotated in the other or subtractive direction. Upon rotation in one or additive direction of the least significant digit wheel the pawls of the locking plate is merely resiliently pressed against the side face of the LSD wheel so as to permit the free rotation thereof.

The above and other objects, features and advantages of the present invention will become more apparent from the following description of two preferred embodiments thereof taken in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENTS

Figure 1:
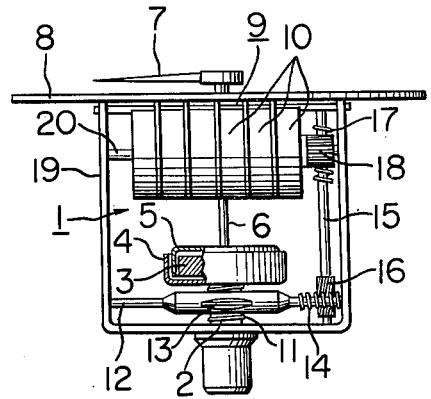
FIG. 1 is a top view of a tachometer or speed meter with a top plate removed, incorporating an odometer in accordance with the present invention.
Figure 2:
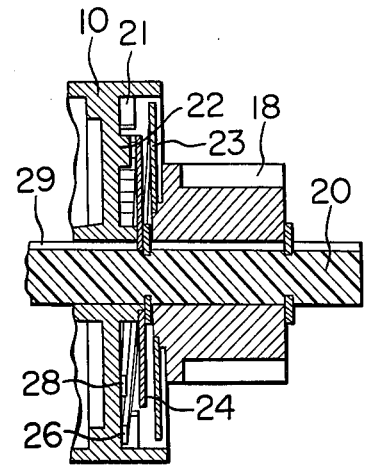
FIG. 2 is a fragmentary, sectional view of a first embodiment of the odometer in accordance with the present invention.
Figure 3:
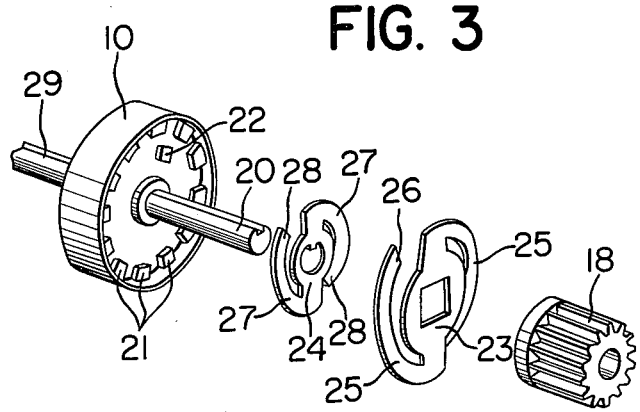
FIG. 3 is an exploded, perspective view of the first embodiment.

First Embodiments, FIGS. 1-3

Referring to FIGS. 1-3, a tachometer-odometer assembly consists of an eddy-current tachometer generally indicated by the reference numeral 1 and an odometer generally depicted by the reference numeral 9. The tachometer 1 has a frame 20 and a main shaft 2 which is drivingly coupled through a flexible cable and gears (not shown) to the transmission main shaft or the propeller shaft in a manner well known in the art. A rotating magnet 3 and a steel cup 4 are mounted at one end of the main shaft 2 for rotation within the frame 19, and close to the revolving magnet 3 is an aluminum cup 5 mounted to a staff or shaft 6 with a pointer 7, pivoted and free to turn against a coiled spring (not shown). As the main shaft 2 and hence the permanent magnet 3 is rotated, the eddy currents are produced in the aluminum cup 5. The magnetic fields caused by these eddy currents produce a torque which acts in a direction to resist the turning magnetic field. The aluminum cup 5 then turns against the spring in the direction of the rotating magnetic field and is dragged until the torque developed by the eddy currents equals that of the spring. The pointer 7 is associated with a calibrated scale 8 mounted on the frame 19 so that the driver may read the traveling speed of his vehicle.

The odometer 9 has a plurality of odometer wheels 10 operatively coupled to each other through gears in a conventional manner so that the odometer 9 may indicate a trip milage in miles or kilometers and tenths of mile or kilometer. These odometer wheels 10 are rotatably mounted on a first cross shaft 20 which in turn is unrotatably supported by the frame 19. A pinion gear 18 is rotatably mounted on the first cross shaft 20 and is in mesh with worm teeth 17 formed adjacent to one end of a longitudinal or connecting shaft 15 rotatably supported by the frame 19 in parallel with the main shaft 2. The other end of the longitudinal or connecting shaft 15 is formed with pinion gear teeth 16 which are in mesh with first worm gear teeth 14 formed at one end of a second cross shaft 12 rotatably supported by the frame 19 at right angles to the main shaft 2. The second cross shaft 12 is further formed with second worm gear teeth 13 intermediate the ends thereof and in mesh with pinion gear teeth 11 formed on the main shaft 2. Thus the rotation of the main shaft 2 is transmitted through the second cross shaft 2 and the longitudinal or connecting shaft 15 to the pinion gear 18 which is positioned adjacent to the least significant digit wheel 10 which indicates tenths of a mile or a kilometer.

Next referring particularly to FIGS. 2 and 3, the operative coupling between the driving pinion gear 18 and the least significant digit wheel 10 will be described. Briefly stated, the rotation in one direction of the driving pinion gear 18 is transmitted to the least significant digit wheel 10 through a driving plate 23 unrotatably mounted on the driving pinion 18 for rotation in unison therewith, but the rotation in the other direction of the driving pinion gear 18 is not transmitted to the least significant digit wheel 10 by means of a locking plate 24 unrotatably mounted on or keyed to the first cross shaft 20 in such a way that a radially inwardly extended protrusion fitted into an axial groove 29 formed in the first cross shaft 20 (See FIG. 3).

As best shown in FIG. 3, the side face of the least significant digit (LSD) wheel 10 adjacent to the driving pinion 18 is formed with a plurality of equiangularly spaced apart first engaging members 21 in coaxial relationship with the wheel 10. These first engaging members 21 may be in the form of teeth or recesses. One or more second engaging members 22 are also formed on the same side face coaxially of the wheel 10 and radially inwardly of the first engaging members 21. The second engaging members 22 may be also in the form of teeth or recesses.

The driving plate 23 is made of a resilient metal or alloy plate such as phosphor bronze and has a pair of arcuate elastic arms 25. Each arcuate arm 25 is extended through nearly 180° and has an average radius (that is, a radius of a centerline chord between the outer and inner arcs of the arcuate arm 25) substantially equal to that of the circumferentially spaced first engaging members 21 on the least significant digit wheel 10. Both the arcuate arms 25 are inclined toward the LSD wheel 10 so that they may be resiliently pressed against the circumferentially spaced apart first engaging members 21 and that the free ends or engaging members 26 of the arcuate elastic arms 25 may engage with the first engaging members 21 angularly spaced apart from each other by nearly 180°. The first engaging members 21 are so shaped that they may drivingly engage with the pawls 26 of the arcuate elastic arms 25 when and only when the main shaft 2 and hence the driving pinion 18 with the driving plate 23 are rotated in one direction or in the clockwise direction in FIG. 3, but they will not engage with the pawls 26 when the main shaft 2 is rotated in the other direction or in the counterclockwise direction in FIG. 3.

The locking plate 24 which is also made of an elastic metal or alloy plate is substantially similar in construction to the driving plate 13 except that the overall diameter thereof and hence the average radius of arcuate elastic arms 27 are smaller than those of the driving plate 23 and that pawls 28 of the arcuate elastic arms 27 engage with the second engaging member or members 22 on the LSD wheel 10 when and only when the latter is caused to rotate in the other direction or in the counterclockwise direction. Therefore the second engaging member or members 22 are so shaped as to engage with the pawls 28 when and only when the LSD wheel 10 is rotated in the other direction.

Next referring to FIGS. 1, 2 and 3, the mode of operation of the first embodiment with the above construction will be described. As the main shaft 2 is rotated in one direction, its rotation is transmitted through the second cross shaft 12 and the longitudinal or connecting shaft 15 to the driving pinion gear 18 in the manner described above. Therefore the driving plate 23 which is nonrotatably mounted on the gear 18 is rotated in one direction so that when the pawls 28 of the elastic arms 25 of the driving plate 23, which are normally resiliently pressed against the first engaging members 21 on the LSD wheel 10, are brought into operative engagement with the first engaging members 21, the LSD wheel 10 is caused to rotate in unison with the driving plate 23 in one direction. The rotation of the LSD wheel 10 is sequentially transmitted or propagated to the higher order digit wheels 10 in a manner well known in the art. In this case, the pawls of the locking plate 24 are resiliently pressed against the side face of the LSD wheel 10, but will not be brought into operative engagement with the second engaging member or members 22 because LSD wheel 10 is now rotated in one or additive direction. That is, the pawl 28 freely and resiliently rides past the second engaging member 22 when the latter is in the form of a tooth or projection. When the second engaging member 22 is in the form of a recess, the pawl 28 drops in it but immediately comes out of it smoothly. Thus, in either case, the pawls 28 of the locking plate 24 will not interfere with the smooth transmission of the rotation of the driving pinion gear 18 to the LSD wheel 10 through the driving plate 23.

When the main shaft 2 and hence the driving gear 18 are rotated in the other direction or in the subtractive direction, the pawls 26 of the driving plate 23 will not operatively engage with the first engaging members 21 on the LSD wheel 10 as described elsewhere. That is, the pawls 26 are merely resiliently pressed against them and ride past them when they are in the form of teeth or projections. In the case of the first engaging members 21 in the form of recesses, the pawls 28 drop into them but immediately come out of them. However, since the pawls 28 are resiliently pressed against the side face of the LSD wheel 10, the latter tends to rotate in the other direction in unison with the driving plate 23. However, as described above, when the LSD wheel 10 is rotated in the other direction, the pawls 28 of the locking plate 24 immediately engage with the second engaging member or members 22. Since the locking plate 24 is unrotatably mounted on the stationary first cross shaft 20, the rotation about the latter of the LSD wheel 10 is locked. Thus the rotation in the other or subtractive direction of the LSD wheel 10 and its succeeding higher digit wheels 10 is positively prevented.

In summary, according to the first embodiment of the present invention, the rotation in the other or subtractive direction of the odometer wheels 10 may be positively prevented by interposing the thin driving and locking plates 23 and 24 between the driving pinion 18 and the least significant digit (LSD) wheel 10 and forming the first and second engagement members 21 and 22 on the side face of the LSD wheel 10 adjacent to the driving gear 18. The tamper preventive clutch or coupling of the present invention is very simple in construction yet highly reliable in operation and may be easily incorporated in conventionally designed odometers.

Figure 4:
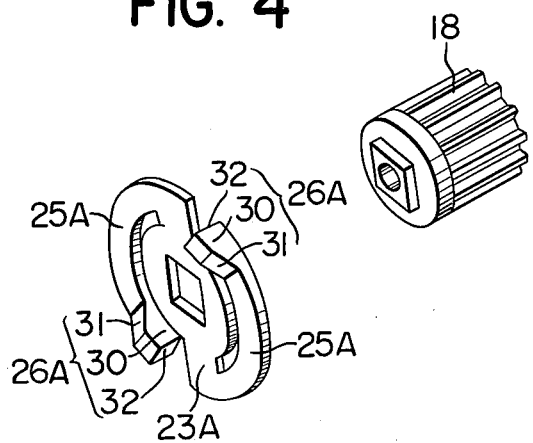
FIG. 4 shows, in perspective view, a driving gear and a driving plate of a second embodiment of the present invention.
Figure 5:
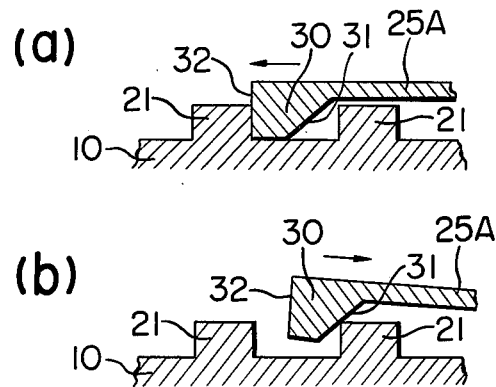
FIG. 5 is a view used for the explanation of the engagement of the pawl of the driving plate shown in FIG. 4 with first engaging means on the least significant digit wheel and the disengagement of the former from the latter.

Second Embodiment, FIGS. 4 and 5

The second embodiment to be described below with reference to FIGS. 4 and 5 is substantially similar in construction to the first embodiment described hereinbefore with reference to FIGS. 1-3 except the shape of the driving plate 23A. That is, the driving plate 23A which is made of a synthetic resin such as polyacetal is substantially similar in construction to that shown in FIGS. 2 and 3 except that the arcuate elastic arm 25A has the pawl 26A in the form of a protrusion 31 which is in the form of a truncated wedge as best shown in FIG. 5 and is axially extended toward the side face of the LSD wheel 10 as best shown in FIG. 4. The truncated wedge-shaped protrusion 30 has a flat top which is connected through an inclined or tapered surface 31 to the side face of the arm 25A oriented toward the LSD wheel 10. The protrusion 30 has an engaging face 32 perpendicular to the side face of the arm 25A directed toward the driving pinion 18.

When the driving plate 23A is rotated in one direction, the pawls 26A engage with the first engaging members 21 as shown in FIG. 5(a). The engaging face 32 of the pawl 26A can engage with the first engaging member 21 with the area of contact by far greater than that attained by the pawl 26 of the arm 25 of the driving plate 23 of the first embodiment. As a result, the more positive engagement between the pawls 26A and their mating engaging members 21 may be ensured and consequently more positive transmission of the rotation of the driving pinion 18 to the LSD wheel 10 may result. In addition, the thickness of the protrusion 30 is by far greater than that of the rest of the arm 25A so that the pawl 26A may be increased in strength and consequently may withstand higher engagement shocks. As a result, the breakdown of the pawl 26A may be avoided and consequently the more higher reliability in operation may be ensured.

When the driving plate 23A is rotated in the other or subtractive direction, the inclined or tapered surface 31 of the pawl 26A may easily ride over the edges of the first engaging members 21 as best shown in FIG. 5(b) so that the free rotation of the driving plate 23A relative to the LSD wheel 10 in the other or subtractive direction may be ensured.

It is apparent that the locking plate 24, which is unrotatably mounted on the first cross shaft 20, may be also designed and constructed in a manner substantially similar to that described above.

What is claimed is:
1. An odometer comprising
a frame,
a first shaft unrotatably supported by said frame,
a driving gear loosely mounted on said first shaft for rotation thereabout and operatively coupled to a suitable rotating member the number of rotations in one direction of which represents a trip mileage of a vehicle or the like,
a plurality of odometer wheels loosely mounted on said first shaft for rotation thereabout and operatively coupled to each other in conventional counter mechanism relationship,
a plurality of first engaging means formed on one side face of the least significant digit odometer wheel adjacent to said driving gear in equiangularly spaced apart relationship with each other and in coaxial relationship with said least significant digit wheel,
one or more second engaging means formed on said one side of said least significant digit wheel in suitably angularly spaced apart relationship with each other and in coaxial relationship with said least significant digit wheel, said one or more second engaging means being located radially inwardly of said first engaging means and spaced apart from each other radially by a suitable distance,
a driving plate mounted on said driving gear for rotation in unison therewith and formed with arcuate elastic arms which are extended concentrically in one direction and have engaging pawls formed at the free ends thereof for selective engagement with said first engaging means on said least significant digit wheel only in said one direction, and
a locking plate unrotatably mounted on or keyed to said first shaft and formed with arcuate elastic arms which are extended coaxially in one direction and have engaging pawls formed at the free ends thereof for selective engagement with said second engaging means on said least significant digit wheel only and only when the latter is rotated in the other direction, whereby when said driving gear is rotated in one direction, said driving wheel is rotated in unison therewith so that said pawls of said arcuate elastic arms of said driving wheel engage with said first engaging means on said least significant digit wheel, thereby rotating the same and its succeeding odometer wheels in said one direction while said pawls of said arcuate elastic arms of said locking plate being resilient pressed against said one side face of said least significant digit wheel but free from engagement with said second engaging means thereupon, but when said driving gear is rotated in the other direction so that said least significant digit wheel tends to rotate in said the other direction, said pawls of said arcuate elastic arms of said locking plate engage with said second engaging means on said least significant digit wheel, thereby locking the rotation in said the other direction of said least significant digit wheel, while said pawls of said arcuate elastic arms of said driving plate being resiliently pressed against said one side face of said least significant digit wheel but free from engagement with said first engaging means thereon and consequently free for rotation in said the other direction relative to said least significant digit wheel so that the rotation in the subtractive direction of said plurality of odometer wheels may be positively prevented.
2. An odometer as defined in claim 1 wherein both said first and second engaging means are in the form of recesses.
3. An odometer as defined in claim 1 wherein both said first and second engaging means are in the form of projections or teeth.
4. An odometer as defined in claim 1 wherein said first engaging means are in the form of recesses while said second engaging means are in the form of projections or teeth or vice versa.

5. An odometer as defined in claim 1 wherein each of said pawls of said arcuate elastic arms of both said driving and locking plates is in the form of a truncated wedge or a trapezoidal in cross section, the smaller base is directed toward said one side face of said least significant wheel while the larger base is in coplanar relationship with one side face of each arcuate elastic arm directed toward said driving gear, the vertical face of said truncated wedge-shaped pawl is for driving or locking engagement with said first or second engaging means on said significant digit wheel, and said smaller base is connected to the other side face directed toward said least significant digit wheel of each arcuate elastic arm with the inclined surface which is adapted to freely ride over said first or second engaging means on said least significant digit wheel when said driving wheel is rotated in the other direction or when said least significant digit wheel is rotated in said one direction.

* * * * *

UNITED STATES PATENT OFFICE
CERTIFICATE OF CORRECTION

Patent No. 4,192,450          Dated March 11, 1980

Inventor(s) Hisao Nezu

It is certified that error appears in the above-identified patent and that said Letters Patent are hereby corrected as shown below:

In the title page, under "Assignee", "Kabishiki" should be

--Kabushiki--.

Signed and Sealed this

Nineteenth Day of August 1980

[SEAL]

Attest:

SIDNEY A. DIAMOND

Attesting Officer    Commissioner of Patents and Trademarks